United States Patent [19]

Orton

[11] Patent Number: 4,488,078

[45] Date of Patent: Dec. 11, 1984

[54] BRUSH WEAR DETECTOR

[75] Inventor: Ronald C. Orton, Erie, Pa.

[73] Assignee: General Electric Company, Erie, Pa.

[21] Appl. No.: 409,234

[22] Filed: Aug. 18, 1982

[51] Int. Cl.[3] .......... H02K 13/00

[52] U.S. Cl. .......... 310/242; 310/245

[58] Field of Search .......... 310/239, 240, 241, 242, 310/244, 245, 246, 247, 71; 200/61.40; 340/648, 679

[56] References Cited

U.S. PATENT DOCUMENTS

| | | | |
|---|---|---|---|
| 2,691,114 | 10/1954 | Lykins | 310/246 |
| 3,523,288 | 8/1970 | Thompson | 340/267 |
| 4,024,525 | 5/1977 | Baumgartner | 340/648 |
| 4,166,227 | 8/1979 | Guglielmo | 310/242 |
| 4,172,988 | 10/1979 | Lowther | 310/245 |
| 4,272,695 | 6/1981 | Buchwald | 310/242 |
| 4,329,683 | 9/1980 | Kimberlin | 310/242 |
| 4,344,009 | 8/1982 | Reynolds | 200/61.4 |
| 4,348,608 | 9/1982 | Michael | 310/242 |

*Primary Examiner*—R. Skudy

*Attorney, Agent, or Firm*—Irving M. Freedman; Vale P. Myles

[57] ABSTRACT

A brush wear detector comprised of an L-shaped leaf spring having the outer end of its longer leg mounted on a first insulating member in fixed relationship to a spring support for a self-winding, brush-biasing spring. A second dielectric member is secured to the leaf spring between the ends thereof and projects outward from the leaf spring into engagement with an uncoiled section of a brush-biasing spring. The free end of the leaf spring is held away from engagement with the brush-biasing spring support, thereby being electrically isolated from it, when a new brush is mounted in operating position under the brush-biasing spring. When the brush becomes worn a pre-determined amount the brush-biasing spring moves in a direction away from the second dielectric member and so enables the leaf spring to force its free end into electrically conducting engagement with the electrically energized spring support. Establishment of that conductive relationship produces a signal that actuates a brush wear indicating circuit that is operatively connected to the leaf spring.

4 Claims, 3 Drawing Figures

BRUSH WEAR DETECTOR

BACKGROUND OF THE INVENTION

The invention relates to a brush wear detector for use on a dynamoelectric machine and in combination with a wear indicating circuit. More particularly, the invention relates to a detector that when mounted in operating relationship on such a machine, is responsive to a predetermined degree of movement of a brush-biasing spring to close an electrical switch contactor and so cause the energization of a brush wear indicating signal circuit.

The use of brush wear detectors and associated brush wear indicating circuits to alert operators of electric machines to the occurrence of a given degree of wear of brushes on the machines is generally well known. In applications of such machines where unscheduled outages are particularly undesirable, the extra costs associated with providing a brush wear indicating function for the machines is commercially acceptable. For example, in certain motors and generators used on vehicles that are often operated for extended periods in locations remote from garages or other convenient maintenance or repair facilities, the importance of warning operating or maintenance personnel to replace extensively worn brushes, in an appropriately timely manner, often mandates the use of brush wear indicators on the machines. The operation of brush wear detectors in such important applications makes it desirable that they be made to reliably respond to the occurrence of a predetermined degree of brush wear. Moreover, the detectors should be capable of energizing an indicating circuit at an accurately set point corresponding to a precisely predetermined degree of wear of an associated brush.

In addition to such operating objectives, brush wear detectors must be able to perform effectively in the relatively harsh environments frequently encountered in their application. Considerable mechanical stress is usually transmitted to brush wear detectors due to both the shocks and vibrations to which an entire motor or generator on which a brush wear detector is mounted, and due to extensive variations in the electric current passing through the windings, communtator and brushes of the motor or generator on which the detector is applied. Finally, the common presence of contaminants, such as carbon dust and other particulate matter from the ambient, all combine to impose stringent requirements on designers of brush wear detectors.

A relatively early type of brush wear detector and indicator arrangement is shown in U.S. Pat. No. 2,691,114, which issued Oct. 5, 1954. The mechanism disclosed in that patent uses an electrical contactor mounted on a brush-follower spring to close a signal circuit responsive to a brush being worn sufficiently to enable the contactor-carrying spring arm to move close enough to a fixed contactor in the path of movement of the spring arm to effect such a circuit completion. One disadvantage of such an arrangement is that the engagement of the movable contactor with the fixed contactor can be easily interrupted due to vibration of the associated brush, thereby causing the brush-follower arm to bounce and intermittently disengage the movable contactor from the fixed contactor. Such tentative contact closure is avoided by other types of brush wear indicators, one example of which is shown in U.S. Pat. No. 3,523,288, that issued Aug. 4, 1970. With the device disclosed in that patent positive switch opening or closing action is obtained for a brush wear indicator by providing an insulated pin that slides on one side of an associated brush until a recess that is machined into the brush at a predetermined point near its upper end is moved under the pin. When such a range of movement occurs, the pin drops into the recess, thus causing a switch in the indicator circuit to snap either open or closed, thereby providing a signal to an associated wear indicating circuit. One disadvantage of such an arrangement is that the use of such a pin as a switch actuator produces a constant drag on the associated carbon brush. Moreover, in that type of arrangement, the pin actually acts to arrest movement of the carbon brush once the pin has dropped into the recess in the brush and into contact with one wall thereof.

The problem of undesirable drag on movement of a brush is avoided by another type of previously known brush wear indicator arrangement, as shown in U.S. Pat. No. 4,024,525, which issued May 17, 1977. In that patent, a brush wear detector probe is mounted on an insulating member adjacent to an elongated groove formed in the side wall of an associated brush. As the brush wears down during its normal operation, the probe is positioned within the groove and spaced from the walls thereof so that it does not conduct current from the brush through the probe to an associated brush wear indicating circuit. When due to wear of the brush, it has moved down sufficiently to bring the end of the probe into contact with the uppermost wall of the groove in the brush, current is conducted from the brush through the probe to the indicator circuit. Although the probe does not restrict brush movement during most of the wear cycle of the brush, the probe does arrest further downward movement of the brush when the probe finally engages the upper wall of the groove. Reduced or intermittant current through the brush, resulting from such a stoppage of brush movement, can limit or impair operation of the associated dynamoelectric machine, until a new brush is installed.

A later U.S. Pat. No. 4,172,988, issued Oct. 30, 1979, discloses a brush wear indicating means that may partially alleviate the problem of downward movement of a brush being arrested by engagement thereof by a brush wear detector mechanism. In that patent, a movable contact is mounted on a relatively long lever arm and is driven into engagement with a fixed contact mounted on an insulating member positioned adjacent to the path of movement of the brush, as a brush-follower spring forces the brush and the movable contact downward. Due to the long lever arm mounting the movable contactor, it is possible for the brush to be pivoted slightly around the fulcrum point of that arm to enable further wear of the brush after the wear-indicating contactors have been engaged. However, the disclosed mechanism still has the inherent disadvantage of severely restricting movement of the brush after the contactors are engaged. Also, this disclosed mechanism is somewhat like the brush wear indicator disclosed in the first patent mentioned above, in that movement of a wear indicating contactor is achieved by using the direct driving thrust of a brush-follower spring to move the contactor. Accordingly, intermittent and weak wear-indicating signals may result due to vibrations being transmitted through the brush to the juxtaposed surfaces of the movable and fixed signal circuit contactors when a predetermined degree of brush wear has been achieved.

It has been recognized that a brush-follower spring of the pre-stressed convoluted type now commonly found in commercial brushholder applications can be used to actuate a brush wear indicating circuit in a way that minimizes the undesirable transmission of vibration from an associated brush to the movable switch contactor of a brush wear indicating circuit. In that regard, U.S. Pat. No. 4,272,695, which issued June 9, 1981 discloses a brush wear indicator mechanism in which a movable contactor-bearing leaf spring is mounted on a support structure to position a movable end of the leaf spring against an uncoiled portion of a brush-biasing spring that has its coiled portion positioned on the upper end of a brush to drive it against an associated commutator or slip ring. As the brush wears, the brush-biasing spring winds up and causes the uncoiled portion to move in a direction away from the free end of the leaf spring. Such movement enables the leaf spring to drive the contactor mounted on it into engagement with a fixed contactor that is mounted on a suitably insulated terminal in the path of movement of the movable contactor. Closure of the two contactors is effective to initiate transmission of a brush wear indicating signal to an associated indicating circuit. A disadvantage of the type of apparatus shown in this patent is that the leaf spring bears against the brush-biasing spring and is energized by it. That arrangement can cause the leaf spring to significantly interfere with the driving force of the brush-biasing spring. In addition, such an arrangement results in the movable contactor being energized at all times, so it is necessary to provide a separately insulated fixed contactor on the brushholder assembly to which the brush wear indicating circuit is connected. It would be desirable to eliminate the added expense inherent in providing such an additional insulated contactor.

Finally, in an earlier filed U.S. patent application, Ser. No. 183,904, which was filed Sept. 4, 1980 and issued May 11, 1982 as U.S. Pat. No. 4,329,683 which is assigned to the assignee of the present invention, there are disclosed several embodiments of brush wear indicators that, respectively, utilize various electro-mechanical transducers operably connected between the coiled portion of a brush-biasing spring and a brush wear signal means to actuate a signal in response to the coiled portion of the spring being moved a predetermined distance. In each of those mechanisms, the transducer is directly connected in line with the driving thrust of the coiled portion of the spring, as it responds directly to brush movement in its control of a movable contactor of a wear-indicating circuit. Means are provided in each of those devices to reduce friction interference between the transducers and the brush-biasing spring. However, due to the direct in-line engagement of the transducers with the respective coiled portions of associated brush-biasing springs, the devices disclosed in that patent do have the disadvantage of transmitting an undesirable amount of vibration from the brush to the wear-indicating circuit contactor. Moreover, the contactor mounting means and spring actuating means disclosed in that patent are relatively expensive to manufacture, complex in structure and space consuming to assemble. Frequently in the context of conventional brushholder assemblies, there is a very limited amount of space available for installing desired brush wear indicators and associated brush wear detector mechanisms, therefore, it is desirable to provide a brush wear detector that requires relatively little space for its installation and operation on a brushholder assembly.

OBJECTS OF THE INVENTION

A major object of the invention is to provide a brush wear detector for use with brushholder assemblies of conventional dynamoelectric machines, and with associated wear indicating circuits, to reliably and accurately detect the occurrence of a predetermined degree of brush wear, in an economical and efficient manner, without impairing or undesirably restricting other operating components of the brushholder assembly.

Another object of the invention is to provide a brush wear detector having a minimum number of components, each of which are economical to construct and assemble.

A further object of the invention is to provide a brush wear detector that is capable of being readily retro-fitted to a wide variety of existing commercial brushholder assemblies to achieve the foregoing objectives.

Still another object of the invention is to provide a brush wear detector that is operable to positively move a contactor into engagement with an energized conductor responsive to the occurrence of a predetermined degree of brush wear, in a manner such that undesired disengagement of the contactor due to vibration of an associated brush is avoided, or significantly diminished, relative to the degree of such vibration-induced disengagement encountered in related prior art brush wear detectors.

Additional objects and advantages of the invention will be apparent to those skilled in the art from the description of it presented herein, taken in conjunction with the accompanying drawings.

SUMMARY OF THE INVENTION

In one embodiment of the brush wear detector of the invention a leaf spring is mounted on a first dielectric member, which is operatively positioned on a brush-biasing spring support to arrange the free end of the leaf spring for reciprical movement between a position of engagement with said spring support and a position of disengagement from the spring support. A second dielectric member is secured to the leaf spring intermediate the ends thereof, and projecting outward therefrom, into engagement with an uncoiled portion of a self-winding, brush-biasing spring that is operatively mounted on said spring support. In operation, the uncoiled portion of the brush-biasing spring is moved toward the spring support thereby causing the second dialectric member to be forced against the biasing action of the leaf spring to move the free end thereof into its position of disengagement relative to the spring support, responsive to the brush-biasing spring being extended sufficiently to enable a relatively new brush to be positioned in operative relationship against the coiled portion of the brush-biasing spring. As the brush wears down to a predetermined length, with the brush-biasing spring holding the brush in conductive relationship with a moving conductor of an associated dynamoelectric machine, the uncoiled portion of the brush-biasing spring moves away from the spring support, thereby enabling the second dielectric member to release the free end of the leaf spring to be moved into engagement with the spring support, under the biasing force of the leaf spring. Such engagement of the leaf spring with the brush-biasing spring support causes the leaf spring to be energized, so that a suitable terminal means and associated brush wear indicator circuit connected thereto will also be energized to provide a signal corresponding to the occurrence of said predetermined degree of brush wear.

DESCRIPTION OF THE PREFERRED EMBODIMENT

The preferred embodiment of the invention disclosed herein will be described in connection with its application on a relatively conventional type of brushholder that is mounted in operating relationship to support a carbon-composition brush in electrically conducting, sliding relationship on a rotatably mounted commutator. It will be recognized that in such a conventional dynamoelectric machine arrangement the brush could equally well be mounted to ride on a slip ring or other movable conductor of the associated machine. Likewise, it will be apparent that a number of different kinds of conventional brushholders can be used with the brush wear detector of the invention, and many different commercially available brushes are adapted to be readily usable in combination with the invention.

Figure 1:
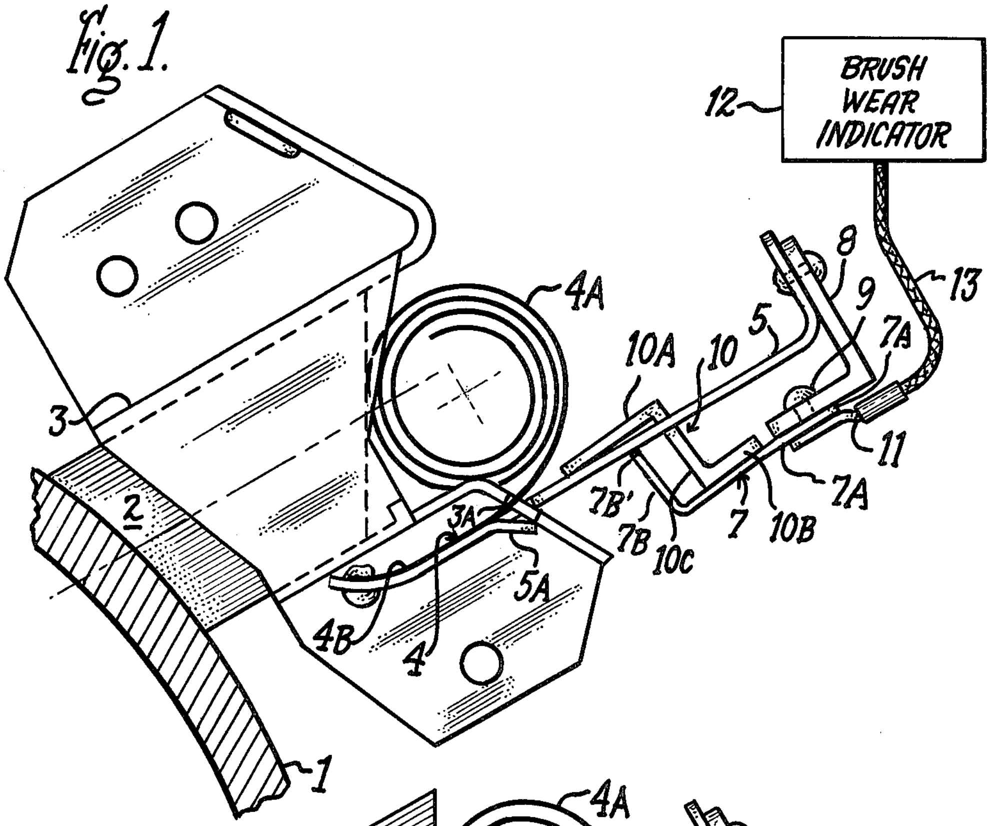
FIG. 1 is a side elevation, partly in cross-section, showing a brush wear detector constructed according to the invention and arranged in operative relationship to a brush-biasing, self-winding spring having a coiled portion positioned against the upper end of a brush to hold it in conductive relationship with a commutator or other conductor on an associated dynamoelectric machine. The brush wear detector is shown in an operating condition where it is effective to energize an associated brush wear indicating circuit to provide a signal that warns an operator that a predetermined degree of wear of the brush has occurred.
Figure 2:
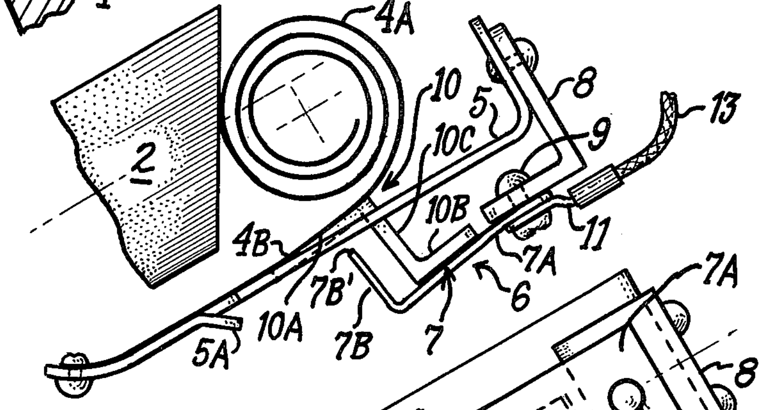
FIG. 2 is a side elevation view of the brush wear detector shown in FIG. 1, illustrated with a fragment of a brush, shown in an operative position where the brush-biasing spring has been extended to accept a relatively new brush thereby causing the brush wear detector to disengage its leaf spring contactor from electrically conducting relationship with the support for the brush-biasing spring.

In FIG. 1 of the drawing there is illustrated a fragment of a rotatably mounted movable conductor 1, such as a slip ring or commutator of a conventional dynamoelectric machine. A suitable carbon brush 2, is supported in a brushholder 3 and is biased against the slip ring 1 by a brush-biasing spring 4 that is mounted with one of its ends fixed to and supported by a rigid electrically conductive brush-biasing spring support 5. Any suitable means may be used for mounting the spring support 5 on the brushholder, such as those used in various commonly known applications of such brushholder mounting arrangements. In the structure shown in FIG. 1, the mounting means includes an integral arm on the spring support 5, which arm is disposed in an aperture 3A through the brushholder, to enable the spring support 5 to pivot, around the fulcrum defined by the end of the arm 5A, as the coiled portion 4A of the brush-biasing spring moves downward, responsive to the brush 2 being worn away during its normal usage. It will be understood that the spring 4 is held in an electrically conductive relationship with the brush 2, and with the spring support 5, when the spring is extended to position the coiled portion 4A thereof in driving relationship with the outer end of the brush 2. If the reader desires a more detailed explanation of a somewhat related type of suitable conventional brushholder arrangement that utilizes an alternatively mounted and operated self-winding spring for biasing a brush against a movable conductor, reference may be made to U.S. Pat. No. 3,526,797, which describes one such alternative mounting means and structural arrangement.

The brush wear detector 6 of the embodiment of the invention described here comprises an electrically conductive leaf spring 7 that has one of its ends 7A mounted in fixed relationship to a first dielectric member 8, while its other end 7B is free to move within a desired range of movement. The leaf spring is formed of suitable spring material, such as spring brass, and is generally L-shaped in configuration. The outer end of the shorter leg 7B' of the L-shaped configuration is disposed to be moved from a disengaged relationship with the brush-biasing spring support 5 to an engaged, electrically conducting relationship with the spring support, responsive to the uncoiled portion 4B of the brush-biasing spring moving away from the spring support 5. Such movement enables the leaf spring 7 to bias its free end 7B' into such engaged, electrically conductive relationship with the spring support 5.

A rivet 9 is ueed to secure spring 7 to the first dielectric member 8. Of course, other suitable means may be used for securing those components together in alternative forms of the invention. Similarly, although the first dielectric member 8 is shown as a generally L-shaped bracket, it may be made of other suitable configurations in constructing alternative forms of the invention, and any suitable insulating material can be made to form the member 8. In this embodiment the member 8 is made of a rigid, thermally stable, phenolic plastic material of any suitable commercially available type.

A second dielectric member 10 is secured to a portion of the leaf spring 7 between its ends. The second dielectric member is arranged to project outward from the leaf spring, through an aperture 5B in spring support 5 (see FIG. 3), to engage an uncoiled portion 4B of the brush-biasing spring 4 when the spring is extended a predetermined length, thereby positioning the second dielectric member to hold the free end 7B of the leaf spring disengaged from the brush-biasing spring support 5.

In the form of the invention described herein, the second dielectric member 10 has a configuration comprising two parallel leg portions 10A and 10B that are joined together by a third leg 10C that is integral with the first two leg portions. The leg 10C is effective to hold the parallel leg portions 10A and 10B in rigid spaced relationship to one another. As shown in the drawing, one of the parallel leg portions 10A extends in a first direction from one end of the connecting leg 10C, while the other leg portion 10B extends from the opposite end of the connecting leg 10C in a direction opposite to the first direction of extention of the leg 10A. One of the leg portions 10B is mounted in fixed relation on the leaf spring 7 between its two ends, by being adherred thereto with a suitable commercial epoxy resin. Of course, other suitable bonding or adherring means may be used to secure the second dielectric member 10 to the intermediate portion of spring 7 in alternative embodiments of the invention. The other leg portion 10A is disposed to engage the uncoiled portion 4B of the brush-biasing spring, responsive to the spring being extended in operating position to bias a relatively new or unworn brush, that is mounted in the brushholder, against the electrically conductive slip ring of the associated dynamoelectric machine.

The leaf spring 7 may be made of any suitable spring material, but in this embodiment of the invention it is formed of spring brass and is made approximately two mils thick. The leaf spring 7 is effective, when mounted on the first dielectric member 8, to move the free end 7B of the spring into electrically conductive engagement with the brush-biasing spring support 5, responsive to the spring 4 winding up as a predetermined degree of wear of the brush 2 occurs. That winding-up movement of the spring 4 causes the uncoiled portion 4B thereof to move in a direction away from the spring support 5 and away from the leg 10A of the second dielectric member 10 of the brush wear detector 6.

Figure 3:
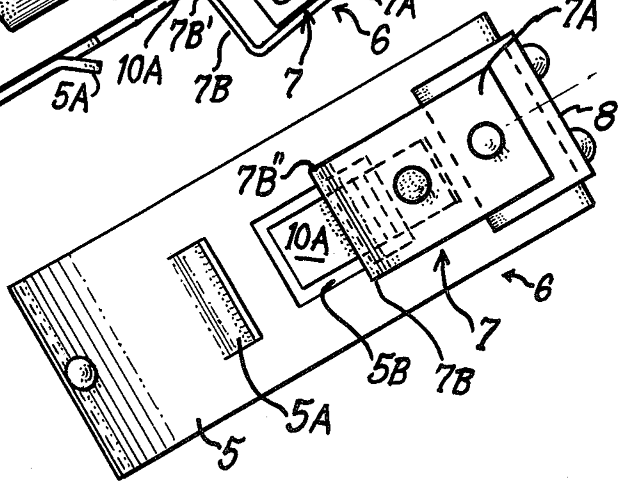
FIG. 3 is a plan view of one side of the brush wear detector shown in FIGS. 1 and 2, illustrating a portion of the brush-biasing spring support and showing the relative widths of the leaf spring part of the detector, and an aperture through the spring support which is adapted to enable a dielectric member mounted on the leaf spring to move freely as it is reciprocated responsive to the biasing force of the leaf spring and the opposing force transmitted to the dielectric member by movement of the brush-biasing spring.

The brush-biasing spring support 5 is provided with an aperture 5B (see FIG. 3) that enables the connecting leg 10C and the first parallel leg portion 10A of the second dielectric member 10 to move freely through it. As shown in FIG. 3, the area of the aperture is made sufficiently large to readily accommodate reciprocal movement of the second dielectric member 10 therethrough, to enable the brush wear detector 6 of the invention to operate in the desired manner, which will be more fully described below. Thus, when the leaf spring 7 biases the second dielectric member toward the uncoiled portion 4B of the brush-biasing spring, the parallel leg portion 10A is enabled to follow the path of movement of the uncoiled portion 4B of the spring away from the spring support 5. The width of the free end 7B of leaf spring 7 is made greater than the width of aperture 5B, as best seen in FIG. 3. Accordingly, at least one of the outer edges 7B″ at the edge 7B′ of the free end 7B of the leaf spring is positioned in electrical engagement with the spring support 5 responsive to the second dielectric member 10 being forced to follow the path of movement of the uncoiled portion 4B of spring 4 by the biasing effect of the leaf spring 7 on the member 10. In this form of the invention, it can be seen that the width of the end 7B of the leaf spring is great enough to cause both ends of its edge 7B′ to engage spring support 5.

The brush wear detector 6, in this embodiment, includes terminal means 11 for electrically connecting a variety of suitable, commercially available brush wear indicating circuits, such as the circuit 12, shown schematically in the drawing, to the leaf spring. Examples of some types of effective brush wear indicating circuits are described in U.S. Pat. No. 3,523,228. It will be recognized that such circuits, as well as others, are suitable for use with the detector 6, of the present invention. The terminal 11 in this form of the invention is a simple spade-type terminal that is electrically and mechanically secured in conducting relationship with the spring 7 by the rivet 9. A suitable conventional conductor 13 of the brush wear indicating circuit is electrically connected to the terminal 11 by being crimped therein in a conventional manner.

In operation of the invention, when the brush wear indicating circuit 12 is connected via conductor 13 to the terminal 11, it can be electrically disconnected from the spring support 5 by operation of the brush wear detector 6, responsive to the brush-biasing spring being extended to at least a predetermined length sufficient to position the brush in the brushholder. The indicating circuit 12 is energized through the leaf spring 7 and the conductor 13, responsive to the occurrence of a predetermined degree of wear of the brush and the resultant engagement of the end 7B of leaf spring 7 with the brush-biasing spring support 5. Such controlled energization, followed by accurately determined de-energization of the brush wear indicating circuit is effective to precisely regulate circuit 12 to provide an operator with an accurate indication of the occurrence of a predetermined degree of wear of of the brush 2 corresponding to the movement of the outer end of brush 2 to a point where leaf spring 7 is moved to contact spring support 5.

It will appreciated that various modifications and alternative forms of the brush wear detector of the invention may be made, in view of the disclosure presented herein. It is my intention to encompass such alternative embodiments within the scope of the following claims.

What I claim and desire to secure by Letters Patent of the United States is:

1. A brush wear detector for a dynamoelectric machine having a brushholder, a brush disposed within said holder, a brush-biasing spring mounted with one of its ends fixed to and supported by an electrically conductive brush-biasing spring support, and means for mounting said spring support on the brushholder in an operating position wherein a coiled portion of the spring acts to bias the brush against an electrically conductive component of said machine and the spring is held in electrically conductive relationship with the brush and the spring support, said brush wear detector comprising:

(a) an electrically conductive leaf spring, having one of its ends mounted in fixed relationship to a first dielectric member and having its other end free to move, said first dielectric member being effective to insulate the leaf spring from the brush-biasing spring support, (b) a second dielectric member secured to a portion of said leaf spring between said ends thereof, said second dielectric member being arranged to project outward from the leaf spring to engage an uncoiled portion of the brush-biasing spring when the brush-biasing spring is extended a predetermined length, thereby positioning said second dielectric member to hold the free end of the leaf spring disengaged from the brush-biasing spring support, (c) said leaf spring being effective to move its free end into electrically conductive engagement with said spring support responsive to the brush-biasing spring winding up as a pre-determined degree of brush wear occurs, thereby to move said uncoiled portion of said brush-biasing spring in a direction away from said second dielectric member, and (d) terminal means for electrically connecting a brush wear indicating circuit to said leaf spring, whereby said circuit can be electrically disconnected from the spring support responsive to the brush-biasing spring being extended to at least said predetermined length, and whereby said circuit is electrically energized through the leaf spring responsive to the occurrence of said predetermined degree of wear of the brush and the resultant engagement of the leaf spring with the brush-biasing spring support.

2. An invention as defined in claim 1 wherein said leaf spring is generally L-shaped in configuration and the outer end of the shorter leg of said L-shaped configuration is said free end of the leaf spring that is moved from a disengaged relationship with the brush-biasing spring support to an engaged, electrically conducting relationship with the spring support, responsive to said uncoiled portion of the brush-biasing spring moving away from the second dielectric member, thereby to enable the leaf spring to bias its free end into such engaged, electrically conductive relationship.

3. An invention as defined in claim 1, wherein said second dielectric member has a configuration comprising two parallel leg portions joined together by a third leg that is integral with the first two leg portions and is effective to hold them in rigid spaced relation to one another, one of said two leg portions extending in a first direction from one end of the connecting leg, and the other of said two leg portions extending from the opposite end of the connecting leg in a direction opposite to said first direction, one of said leg portions being mounted in fixed relation on the leaf spring between its two ends, and the other of said two leg portions being disposed to engage said uncoiled portion of the brush-biasing spring, responsive to its being extended in operating position to bias a new brush mounted in the brush-holder against said electrically conductive brush-biasing spring support of the machine.

4. An invention as defined in claim 3, wherein the brush-biasing spring support is provided with an aperture that enables the connecting leg and the first parallel leg portion of said second dielectric member to move freely through it, thereby enabling the leaf spring to bias the second dielectric member toward the uncoiled portion of the brush-biasing spring to follow its path of movement, the width of said free end of the leaf spring being wider than the aperture through the brush-biasing spring support thereby to position at least one of the outer edges of the free end of the leaf spring in said electrical engagement with said spring support.

* * * * *